US010053893B1

(12) United States Patent
Patel et al.

(10) Patent No.: US 10,053,893 B1
(45) **Date of Patent: *Aug. 21, 2018**

(54) FLUSH-MOUNTED DOOR HANDLE FOR VEHICLES

(71) Applicant: Ford Global Technologies, LLC, Dearborn, MI (US)

(72) Inventors: Rajesh K. Patel, Farmington Hills, MI (US); Kosta Papanikolaou, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,372

(22) Filed: Mar. 28, 2018

Related U.S. Application Data

(63) Continuation of application No. 13/608,303, filed on Sep. 10, 2012, now Pat. No. 9,957,737.

(Continued)

(51) Int. Cl.

| | |
|---|---|
| ***B60R 25/00*** | (2013.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |

(Continued)

(52) U.S. Cl.
CPC .............. *E05B 81/76* (2013.01); *E05B 81/77* (2013.01); *E05B 81/78* (2013.01); *E05B 85/10* (2013.01); *Y10T 292/1082* (2015.04)

(58) Field of Classification Search
CPC .......... E05B 81/76; E05B 81/77; E05B 81/78; E05B 85/10; E05B 17/10; E05B 41/00; E05B 85/107; Y10T 292/1082; B60Q 3/0233; B60R 25/24; B60J 1/14
See application file for complete search history.

(56) References Cited

U.S. PATENT DOCUMENTS 2,480,688 A 8/1949 Allen
4,681,357 A * 7/1987 Uemura ................. E05B 85/18 16/416

(Continued)

FOREIGN PATENT DOCUMENTS

CN 1856630 A 11/2006
DE 19620059 A1 11/1997

(Continued)

*Primary Examiner* — Quang D Pham
(74) *Attorney, Agent, or Firm* — Jason Rogers; Price Heneveld LLP

(57) ABSTRACT

An electronic door latch includes a sensor mounted inside of an outer surface of the door. The sensor may be a proximity sensor, a touch sensor or other suitable sensor configured to determine if a user's hand is present. The door latch release system further includes a powered latch that selectively retains the door latch in a closed position. The system may include a handle formed by a flange or other structure extending across a portion of a recess or pocket in the door. The system may include a receiver that utilizes a signal from a security transmitter (e.g. keyless entry fob).

17 Claims, 6 Drawing Sheets

Related U.S. Application Data

(60) Provisional application No. 61/666,493, filed on Jun. 29, 2012.

(51) Int. Cl.

| | |
|---|---|
| ***H04Q 1/00*** | (2006.01) |
| ***H04Q 9/00*** | (2006.01) |
| ***E05B 81/76*** | (2014.01) |
| ***E05B 85/10*** | (2014.01) |
| ***E05B 81/78*** | (2014.01) |

(56) References Cited

U.S. PATENT DOCUMENTS

| | | | | |
|---|---|---|---|---|
| 4,703,963 | A | 11/1987 | Ball | |
| 4,895,403 | A | 1/1990 | Osenkowski | |
| 4,998,759 | A * | 3/1991 | Peterson | E05B 85/045 292/340 |
| 5,056,343 | A | 10/1991 | Kleefeldt et al. | |
| 5,058,258 | A | 10/1991 | Harvey | |
| 5,248,175 | A | 9/1993 | Bums | |
| 5,297,010 | A | 3/1994 | Camarota | |
| 5,332,273 | A | 7/1994 | Komachi | |
| 5,352,004 | A * | 10/1994 | Nedbal | E05B 85/18 292/347 |
| 5,369,911 | A | 12/1994 | Fortunato | |
| 5,494,322 | A | 2/1996 | Menke | |
| 5,560,659 | A | 10/1996 | Dault | |
| 5,632,516 | A | 5/1997 | Schwab | |
| 5,669,642 | A | 9/1997 | Kang | |
| 5,852,944 | A | 12/1998 | Collard, Jr. et al. | |
| 5,862,896 | A | 1/1999 | Villbrandt et al. | |
| 5,964,487 | A | 10/1999 | Shamblin | |
| 5,979,114 | A | 11/1999 | Clark | |
| 6,027,148 | A | 2/2000 | Shoemaker | |
| 6,039,366 | A * | 3/2000 | Lewis | E05B 79/06 292/352 |
| 6,070,998 | A * | 6/2000 | Jennings | B60Q 1/2669 362/100 |
| 6,089,626 | A | 7/2000 | Shoemaker | |
| 6,256,932 | B1 | 7/2001 | Jyawook et al. | |
| 6,367,124 | B1 | 4/2002 | Bella et al. | |
| 6,412,584 | B1 * | 7/2002 | Faigle | B60R 21/01 16/254 |
| 6,441,512 | B1 | 8/2002 | Jakel et al. | |
| 6,530,251 | B1 | 3/2003 | Dimig | |
| 6,577,226 | B1 | 6/2003 | Steiner | |
| 6,588,813 | B1 | 7/2003 | Marcarini et al. | |
| 6,598,913 | B2 | 7/2003 | Meinke | |
| 6,669,267 | B1 * | 12/2003 | Lynam | B60J 5/0404 296/146.5 |
| 6,698,262 | B2 | 3/2004 | Wittwer | |
| 6,715,806 | B2 | 4/2004 | Arlt et al. | |
| 6,740,834 | B2 | 5/2004 | Sueyoshi et al. | |
| 6,779,372 | B2 | 8/2004 | Arlt et al. | |
| 6,786,070 | B1 | 9/2004 | Dimig et al. | |
| 6,803,733 | B1 * | 10/2004 | Shabana | E05F 11/486 296/146.11 |
| 6,825,752 | B2 * | 11/2004 | Nahata | E05B 81/78 180/273 |
| 6,843,085 | B2 | 1/2005 | Dimig | |
| 6,851,290 | B1 * | 2/2005 | Meier | E05B 15/0006 292/340 |
| 6,923,481 | B2 | 8/2005 | Bruderick et al. | |
| 6,933,831 | B2 | 8/2005 | Ieda et al. | |
| 6,998,968 | B2 | 2/2006 | Gamault et al. | |
| 7,055,997 | B2 | 6/2006 | Baek | |
| 7,062,945 | B2 | 6/2006 | Saitoh et al. | |
| 7,070,018 | B2 | 7/2006 | Kachouh | |
| 7,071,812 | B2 * | 7/2006 | Mafune | B60R 25/246 340/426.28 |
| 7,108,301 | B2 | 9/2006 | Louvel | |
| 7,173,346 | B2 | 2/2007 | Aiyama et al. | |
| 7,199,317 | B2 | 4/2007 | Ieda et al. | |
| 7,217,899 | B2 | 5/2007 | Hidaka et al. | |
| 7,270,029 | B1 | 9/2007 | Papanikolaou et al. | |
| 7,300,190 | B2 | 11/2007 | Nitawaki et al. | |
| 7,360,803 | B2 | 4/2008 | Parent et al. | |
| 7,363,788 | B2 | 4/2008 | Dimig et al. | |
| 7,375,299 | B1 * | 5/2008 | Pudney | E05B 81/78 200/61.62 |
| 7,446,645 | B2 | 11/2008 | Steegmann et al. | |
| 7,543,863 | B2 | 6/2009 | Herbert et al. | |
| 7,621,573 | B2 | 11/2009 | Thomas et al. | |
| 7,642,669 | B2 | 1/2010 | Spurr | |
| 7,705,722 | B2 | 4/2010 | Shoemaker et al. | |
| 7,747,286 | B2 | 6/2010 | Conforti | |
| 7,751,664 | B2 | 7/2010 | Ieda et al. | |
| 7,791,218 | B2 | 9/2010 | Mekky et al. | |
| 7,810,856 | B2 | 10/2010 | Muller et al. | |
| 7,819,442 | B2 * | 10/2010 | Ieda | B60R 25/24 292/336.3 |
| 7,926,385 | B2 | 4/2011 | Papanikolaou et al. | |
| 7,931,314 | B2 | 4/2011 | Nitawaki et al. | |
| 7,984,937 | B2 | 7/2011 | Tanimoto et al. | |
| 9,721,403 | B2 * | 8/2017 | Muller | B60R 25/2045 |
| 2001/0028297 | A1 | 10/2001 | Hara et al. | |
| 2002/0121786 | A1 | 9/2002 | Meinke | |
| 2003/0001729 | A1 * | 1/2003 | Ieda | B60R 25/246 340/426.1 |
| 2003/0025337 | A1 | 2/2003 | Suzuki et al. | |
| 2003/0031025 | A1 * | 2/2003 | Huizenga | B60Q 1/2669 362/501 |
| 2003/0107469 | A1 * | 6/2003 | Emmerling | B60R 25/24 340/5.7 |
| 2003/0111863 | A1 | 6/2003 | Weyerstall et al. | |
| 2003/0122556 | A1 * | 7/2003 | Sueyoshi | B60R 25/246 324/686 |
| 2003/0182762 | A1 * | 10/2003 | Koops | E05B 17/0016 16/412 |
| 2003/0184098 | A1 | 10/2003 | Aiyama | |
| 2004/0135380 | A1 * | 7/2004 | Bruderick | E05B 81/76 292/336.3 |
| 2004/0177478 | A1 | 9/2004 | Louvel | |
| 2004/0183651 | A1 * | 9/2004 | Mafune | B60R 25/246 340/5.7 |
| 2004/0201226 | A1 * | 10/2004 | Spurr | E05B 81/14 292/201 |
| 2004/0217601 | A1 | 11/2004 | Gamault et al. | |
| 2004/0222649 | A1 | 11/2004 | Ito et al. | |
| 2005/0083174 | A1 * | 4/2005 | Nakamura | B60R 25/246 340/5.72 |
| 2005/0230237 | A1 | 10/2005 | Ieda et al. | |
| 2005/0231364 | A1 | 10/2005 | Nitawaki et al. | |
| 2005/0236846 | A1 | 10/2005 | Hidaka et al. | |
| 2006/0132282 | A1 * | 6/2006 | McCall | B60R 1/12 340/5.2 |
| 2006/0143857 | A1 | 7/2006 | Freyholdt et al. | |
| 2006/0224290 | A1 * | 10/2006 | Nakashima | B60R 25/24 701/49 |
| 2006/0232378 | A1 | 10/2006 | Ogino | |
| 2007/0069531 | A1 | 3/2007 | Herbert et al. | |
| 2007/0091627 | A1 | 4/2007 | Nitawaki et al. | |
| 2007/0132553 | A1 | 6/2007 | Nakashima | |
| 2007/0216174 | A1 | 9/2007 | Tanimoto et al. | |
| 2007/0216175 | A1 * | 9/2007 | Tanimoto | E05B 81/78 292/336.3 |
| 2008/0021619 | A1 | 1/2008 | Steegmann et al. | |
| 2008/0061933 | A1 | 3/2008 | Ieda et al. | |
| 2008/0068857 | A1 * | 3/2008 | Meinke | B60Q 1/2669 362/546 |
| 2008/0088138 | A1 * | 4/2008 | Inoue | E05B 81/20 292/259 A |
| 2008/0163555 | A1 * | 7/2008 | Thomas | E05B 85/10 49/460 |
| 2008/0202912 | A1 | 8/2008 | Boddie et al. | |
| 2008/0224482 | A1 | 9/2008 | Cumbo et al. | |
| 2008/0250607 | A1 | 10/2008 | Ito | |
| 2008/0303291 | A1 | 12/2008 | Spurr | |
| 2009/0039671 | A1 | 2/2009 | Thomas et al. | |
| 2009/0133510 | A1 * | 5/2009 | Witte | E05B 81/78 73/862.626 |

(56) References Cited

U.S. PATENT DOCUMENTS

| | | | | |
|---|---|---|---|---|
| 2009/0160211 | A1 | 6/2009 | Krishnan et al. | |
| 2009/0257241 | A1 | 10/2009 | Meinke et al. | |
| 2009/0279826 | A1 | 11/2009 | Ieda et al. | |
| 2009/0309971 | A1 | 12/2009 | Schuetz | |
| 2010/0007463 | A1* | 1/2010 | Dingman | B60Q 1/2669 340/5.72 |
| 2010/0011821 | A1 | 1/2010 | Kim | |
| 2010/0187838 | A1* | 7/2010 | Ieda | B60R 25/00 292/336.3 |
| 2010/0192329 | A1* | 8/2010 | Ieda | B60R 25/246 16/421 |
| 2010/0205780 | A1* | 8/2010 | Ieda | B60R 25/00 16/412 |
| 2010/0235057 | A1 | 9/2010 | Papanikolaou et al. | |
| 2010/0235058 | A1 | 9/2010 | Papanikolaou et al. | |
| 2010/0235059 | A1 | 9/2010 | Krishnan et al. | |
| 2010/0237635 | A1* | 9/2010 | Ieda | E05B 81/78 292/336.3 |
| 2010/0271049 | A1 | 10/2010 | Van Gastel et al. | |
| 2011/0025522 | A1 | 2/2011 | Peschl et al. | |
| 2011/0099911 | A1 | 5/2011 | Ellis et al. | |
| 2011/0148575 | A1 | 6/2011 | Sobecki et al. | |
| 2011/0241370 | A1* | 10/2011 | Alvarez | B60R 13/04 296/1.08 |
| 2011/0260831 | A1 | 10/2011 | Ieda et al. | |
| 2012/0019014 | A1 | 1/2012 | Tateishi et al. | |
| 2012/0119524 | A1 | 5/2012 | Bingle et al. | |
| 2012/0133159 | A1 | 5/2012 | Tateishi et al. | |
| 2012/0133563 | A1 | 5/2012 | Naka | |
| 2012/0205924 | A1 | 8/2012 | Muller et al. | |
| 2012/0228886 | A1 | 9/2012 | Muller et al. | |
| 2012/0247161 | A1 | 10/2012 | Muller et al. | |
| 2013/0104459 | A1 | 5/2013 | Patel et al. | |
| 2013/0170241 | A1* | 7/2013 | Lesueur | E05B 77/06 362/501 |

FOREIGN PATENT DOCUMENTS

| | | |
|---|---|---|
| DE | 102005041551 A1 | 3/2007 |
| EP | 1403453 | 3/2004 |

* cited by examiner

FLUSH-MOUNTED DOOR HANDLE FOR VEHICLES

CROSS REFERENCE TO RELATED APPLICATIONS

This application is a continuation of U.S. Pat. No. 9,957,737, issued May 1, 2018, entitled "FLUSH-MOUNTED DOOR HANDLE FOR VEHICLES," which claims the benefit of U.S. Provisional Application No. 61/666,493, filed Jun. 29, 2012, entitled, "FLUSH-MOUNTED DOOR HANDLE FOR VEHICLES," the entire disclosures of each of which are incorporated herein by reference.

FIELD OF THE INVENTION

The present invention relates to flush-mounted door handles for vehicles that may utilize a powered latch.

BACKGROUND OF THE INVENTION

Vehicle door handles typically protrude from the door, and interfere with vehicle styling and/or aerodynamics. Various outside door handles such as paddle type handles, pull-strap handles, push-button activated handles, and the like have been developed. However, known conventional door handles may suffer from various drawbacks.

SUMMARY OF THE INVENTION

One aspect of the present invention is a flush-mounted door handle that is operably interconnected with an electronic door latch release for motor vehicles of the type having a door with a door structure and an outer surface and/or keyless entry feature and/or a styled ("Class A") outer surface portion. The handle outer surface is defined by the styled surface of the vehicle, and may comprise a portion of the substantially continuous portion of the styled outer surface. The handle is flush to the door frame outer surface which is covered with a Decorative Class part known as the appliqué. A sensor is mounted to the door at a location adjacent the portion of the outer surface defining a surface contour. The sensor is selected from the group consisting of proximity sensors or touch sensors. The release system may also include a visual indicator on the door that is configured to convey the general location of the sensor to a user. The visual indicator may comprise a light, a marking or the like on the surface of the door, a recessed pocket, or other indicia or irregularity on the outer side of the door. The door latch release system further includes a powered latch that retains the door in a closed position when the latch is in an engaged configuration, and permits opening of the door when the latch is in a release configuration. The powered latch shifts from the engaged configuration to the release configuration if the sensor generates a predefined signal indicating that a user has actuated the sensor/switch. The system may include a handle formed by a recess in an outer side or surface of the door. A flange or other structure extends across a portion of the recess to form a pocket that provides an inwardly-facing grip surface that allows a user to pull the door open without movement of the handle relative to the vehicle door. The system may include a receiver also known as door control unit (DCU) that utilizes a signal from a security transmitter (e.g. keyless entry fob). The system may include a proximity (e.g. capacitive) or a touch sensitive pad (e.g. piezoelectric or other pressure/force detection sensor) that is operably connected to the sensor, and is actuated when a user touches the sensor or other surface. The system may comprise a handle located above the door belt line in a vertically extending portion of a door frame adjacent to a window of the door. The handle may comprise a vertically elongated opening, recess or depression into the door having a surface that faces outwardly. The system may also include a touch keypad with numbers that are normally hidden, but illuminate when the hidden keypad is touched. The keypad may be utilized to enter security codes or the like.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8.

DETAILED DESCRIPTION OF THE PREFERRED EMBODIMENTS

Figure 1:
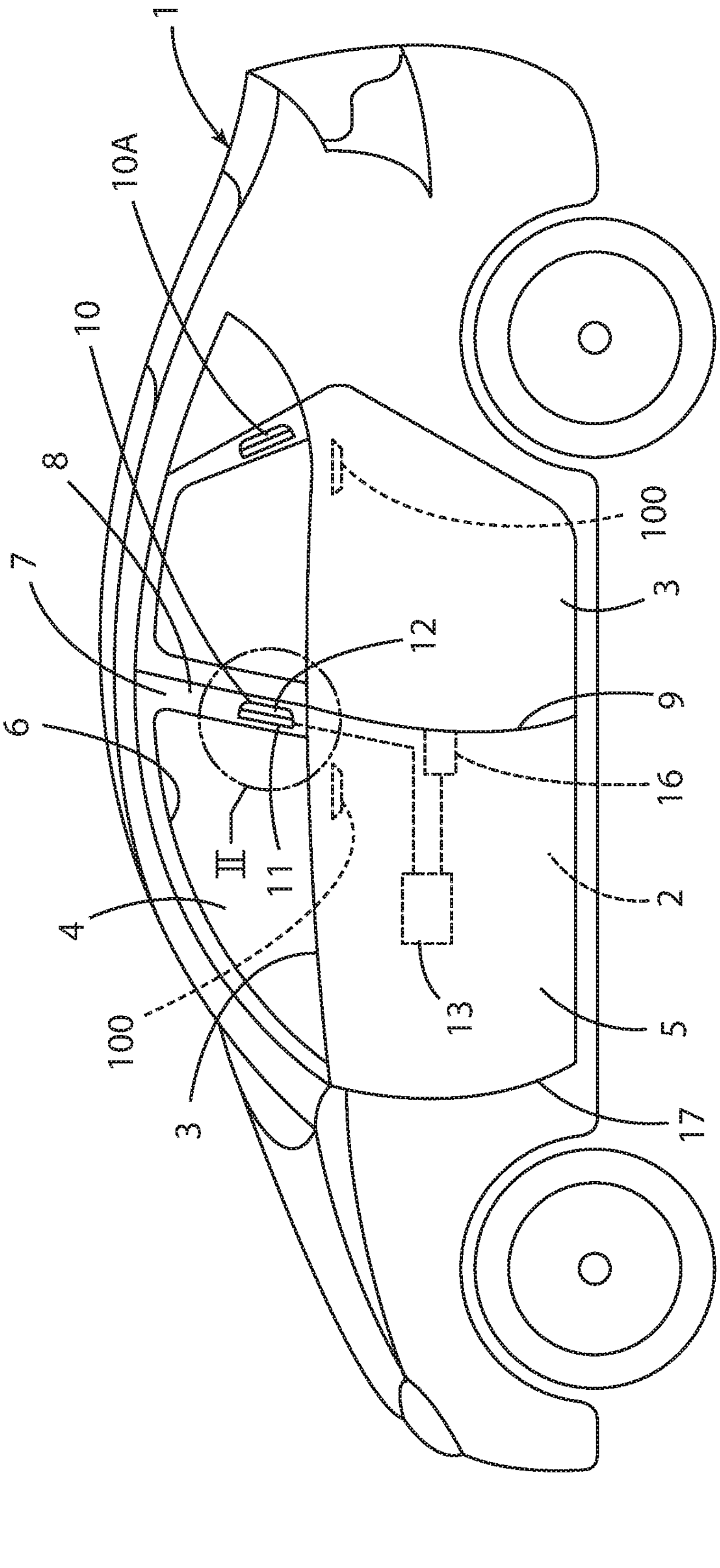
FIG. 1 is a side elevational view of a motor vehicle incorporating a flush door handle according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specifications are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes front and rear doors 2 and 3, respectively, and a flush-mounted handle assembly 10 that requires no moving parts to be manually actuated by a user. It will be understood that the vehicle also includes front and rear doors on the passenger side that are substantially identical to the doors 2 and 3 shown in FIG. 1. The door 2 includes a beltway 3, a window 4 above the beltway, and a lower surface 5 below the beltway. The door 2 also includes a door frame 6 having a portion 7 having an outer surface 8. The door also includes a handle assembly 10 having a styled or "Class A" outer surface 11 that is substantially flush to the outer surface 8 of door frame 6. The handle 10 is fixed (i.e. does not move or have any moving parts) and is preferably flush to the door outer surface 8. Handle assembly 10 may also include an inwardly-extending depression and/or an outwardly-facing projection 12A forming a pocket 12 that is configured to receive a user's fingers whereby the user can grasp the handle 10 and pull the door 2 to an open position upon release of the door latch.

Figure 3:
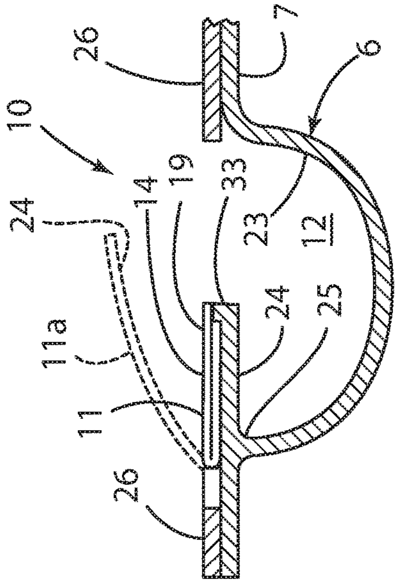
FIG. 3 is a cross-sectional view of a first version of the door assembly of FIG. 2 taken along the line FIG. 2.
Figure 2:
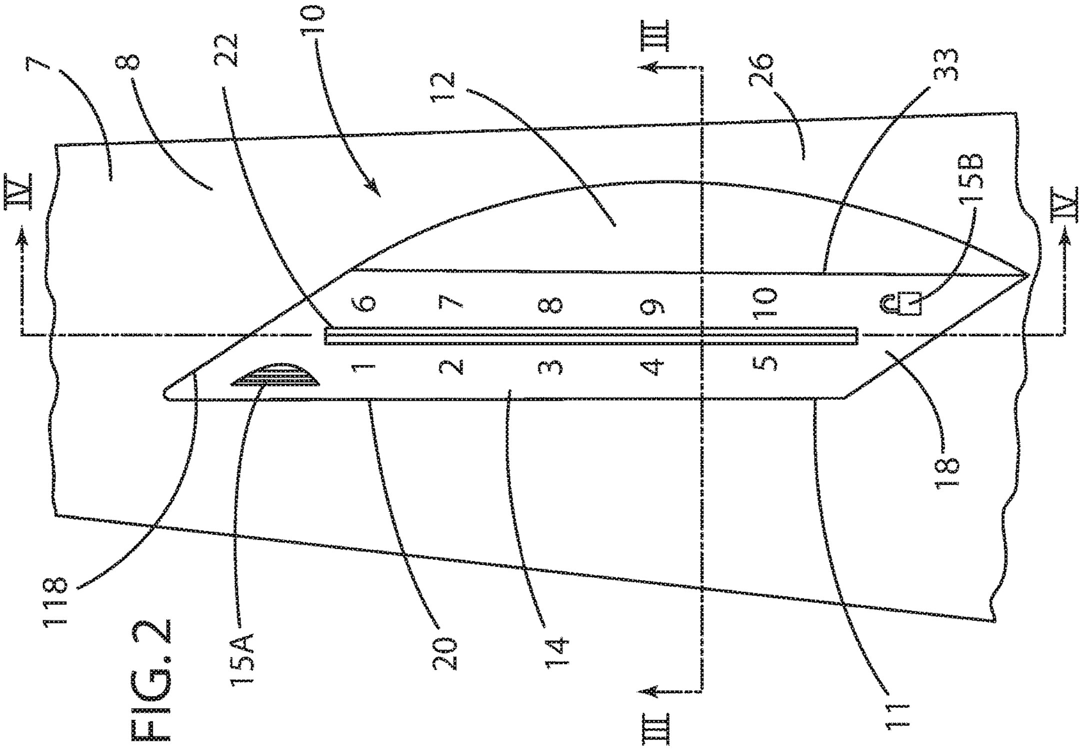
FIG. 2 is a fragmentary, enlarged view of a portion of the vehicle door of FIG. 1.

With further reference to FIGS. 2 and 3, handle assembly 10 may include a touchpad 20 and a sensor symbol or indicia 15 that may operably connected to powered latch 16 (FIG. 1). Powered latch 16 may be substantially the same as the latches disclosed in U.S. patent application Ser. No. 12/402,744 entitled "Universal Global Latch System" (U.S. Patent Publication No. 2010/0235057), now U.S. Pat. No. 8,746,755 and/or U.S. patent application Ser. No. 12/402,792 entitled "Universal Global Latch System" (U.S. Patent Publication No. 2010/0235059), now U.S. Pat. No. 8,544,901 and/or the side door latch of U.S. patent application Ser. No. 12/402,768 entitled "Latch Mechanism" (U.S. Patent Publication No. 2010/0235058), now U.S. Pat. No. 8,573,657 the entire contents of each of these applications being incorporated herein by reference. Powered latch 16 has locked and unlocked states corresponding to manual door locks. Switch or sensor 15 is typically included in handle assembly 10 if handle assembly 10 does not include a Passive Entry Passive Start system (PEPS). A PEPS system typically includes a fob that can be detected by an antenna in the vehicle. The PEPS controller unlocks the vehicle door(s) if it senses an authorized fob, and locks the doors after the fob/user is inside the vehicle. Because the vehicle is locked/unlocked based on detection of an authorized fob, no pushbuttons or other specific manual input by a user is required for operation or a PEPS system.

In vehicles that are not equipped with a PEPS system, a user pushbutton 15 or other suitable input (e.g. remote fob with pushbutton lock/unlock feature) is utilized. A sensor symbol or indicia 15A may be provided to enable a user to locate the sensor 15. Indicia 15A may comprise lines that are printed on outer surface 11, or the sensor symbol 15 may comprise side-by-side raised ridges and grooves that form lines, a pad lock icon, or the like. Sensor 15 may comprise a push button that unlocks the vehicle doors in substantially the same manner as known remote pushbutton fobs/powered door locks. The surface of indicia 15A may comprise a membrane or the like to permit manual switch activation. Still further, the sensor symbol/indicia 15 could include an LED light or the like that illuminates when the presence of a specific key fob (not shown) is detected and a user touches this area of surface 11. The handle assembly 10 may further include an illuminated lock symbol 15B that lights up when the vehicle is locked, and may be configured to fade to a non-illuminated state after a predefined time period (e.g. 5, 10, or 30 seconds, or a predefined number of minutes).

Instead of a pushbutton, sensor 15 may comprise a proximity locking sensor 44 (see also FIGS. 4-6) on the back side of indicia 15 that allows a user to lock the vehicle without using the key fob by moving his/her hand into a predefined detection range. An unlatch sensor 46 may be located on the backside of the handle class A surface and it may extend along a majority of the grip length of the handle adjacent edge 33 which the user activates via proximity or touch. Once the key fob presence is detected (range is 1 m) the vehicle owner is authenticated by the vehicle's keyless entry module via the established communication protocol between the vehicle owner's key fob, via an LF antenna 18 packaged inside the module housing 36 facing the outer surface of the handle (i.e. behind the class A surface), the DCU and the BCM body control module.

In summary, there are typically at least three electrical elements included in the entry system: 1) a proximity or touch lock sensor 44; 2) a proximity or touch unlatch sensor 46; 3) a LF Antenna. Front and rear door handle 10 and 10A, respectively, may have the same number of electrical elements or fewer depending on the level of keyless entry functionality the OEM intends to offer to the Customer.

The surface 18 may comprise an antenna that is operably connected to a low frequency receiver to thereby determine if a specific key fob is within a predefined distance. A piezoelectric touch sensor or capacitive (i.e. proximity) unlatch sensor 46 may be positioned behind the antenna layer 18. A series of numbers of other indicia may be utilized to form the keypad 20. Keypad 20 can be actuated by a user touching the surface 11 in the region of the indicia 20. In the illustrated example, the indicia forming hidden keypad 20 comprise numbers that are visible only when lit. For example, each number may comprise a lens or aperture having the shape of the number, and an LED or other light source may be positioned behind the aperture. When the handle assembly 10 detects the presence of a user as a result of a key fob being present and as a result of touching surface 11, the LEDs may light up, thereby causing the indicia 20 to illuminate and become visible. The hidden keypad 20 permits a user to enter a specified code to thereby authorize entry. A chrome strip 22 or the like may extend vertically to visually divide the surface 11 and provide a distinctive appearance.

Referring again to FIG. 3, recess 12 may comprise a shallow inwardly depressed curved concave surface 23 of upwardly extending portion 7 of doorframe 6 that forms a pocket for receiving a user's fingers. Alternately, the outer surface may comprise an outwardly-protruding surface 11A having inner surface 24A. If handle 10 includes an outwardly-protruding surface 11A, surface 23 may be shallow, or flush with outer surface 8. The module 14 may extend inwardly to cover a portion of recess 12 and form an inwardly facing surface 24. Surfaces 23 and 24 intersect at inner corner 25. The handle is positioned at an ergonomic location on the door 2, 3 such that it is convenient for a user to touch the handle surface 11 and unlatch the door 2, 3 and then use their fingers to grab the door 2, 3 via the pocket or recess 12 described earlier to control the door 2, 3. The concave surface 23 may be partially or completely formed in the front pillar structure of rear door 3, or it may be formed in an outer surface (e.g. surface 5) of the door. Thus, edge 33 and inner surface 24 may be formed by the vehicle door and the concave, outwardly opening portion 23 may be formed by the vehicle body.

Figure 4:
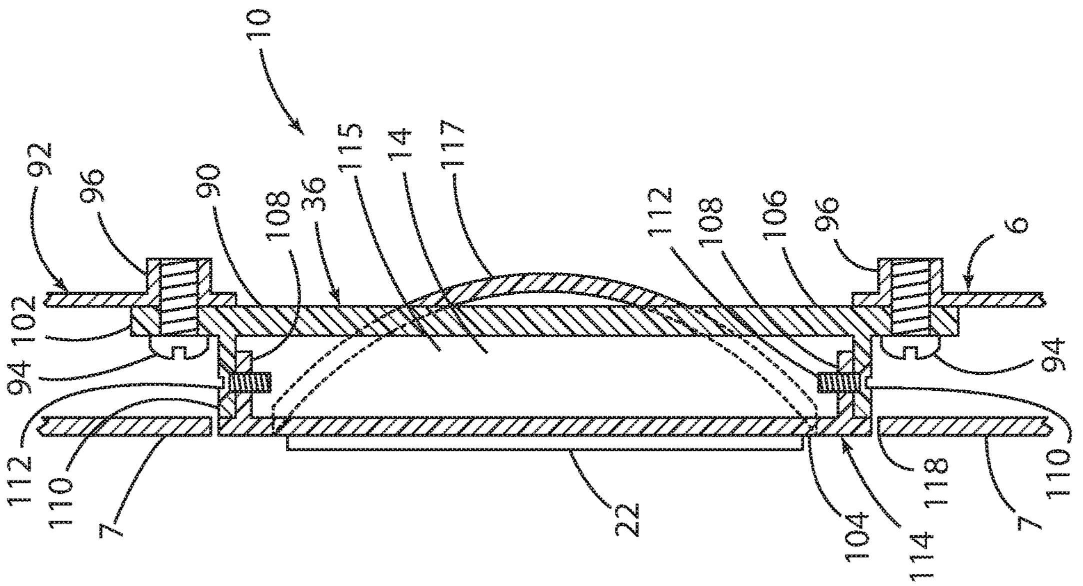
FIG. 4 is a cross sectional view of a second version of the door handle of FIG. 3.

With further reference to FIG. 4, handle assembly 10 includes a module housing 36 disposed in an opening 114 defined by edge 118 of appliqué 7. Module housing 36 is formed by outer and inner members 104 and 106, respectively (see also FIG. 5), which members may comprise a molded polymer material. Module housing 36 is secured to inner door structure 92 by conventional screws or threaded fasteners 94 and nuts 96. Threaded fasteners 94 extend through openings 98 in flange(s) 102 of inner member 106. Flanges or tabs 108 of outer member 104 are received in channels 120 (FIG. 5) formed in sidewalls 110 of inner member 106. Screws 112 or other suitable fastening arrangement interconnect outer and inner members 104 and 106, respectively. Flanges/tabs 108 may comprise barbed members, and channels 120 may comprise corresponding snap fit connectors. Barbed connectors of this general type are well-known, and the details of the connection of tabs 18 and channels 120 will therefore not be described in detail herein. Outer and inner members 104 and 106, respectively, together define an interior space 115. When fully assembled, keyless entry module 14 (FIGS. 6 and 7) is disposed in space 115. A finger access pocket 117 (FIG. 4) is formed/molded integrally into the appliqué 7.

Figures 5, 6, 7:
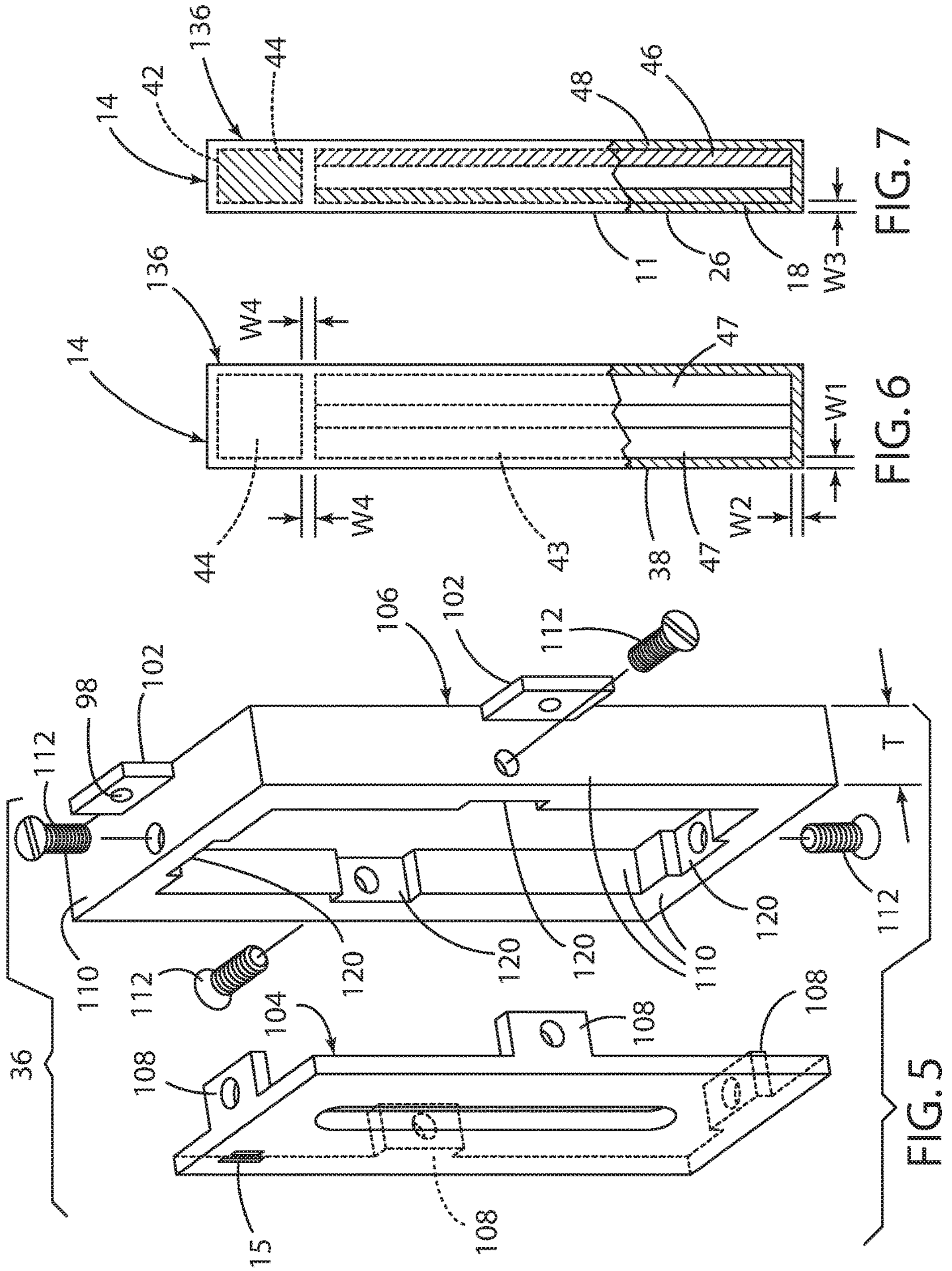
FIG. 5 is an exploded isometric view of a cover and housing for a piezoelectric or capacitive sensor version of the handle of FIG. 1.
FIG. 6 is a partially fragmentary schematic front view of a keyless entry subassembly incorporating a piezoelectric or capacitive sensor.
FIG. 7 is an edge view of the keyless entry subassembly of FIG. 6.

When layer 26 and housing 28 are assembled, a module housing 36 is formed. In the illustrated example, the housing 36 has a quadrilateral perimeter shape 38 when viewed from the front (FIG. 6), and it also has a quadrilateral perimeter shape 40 in edge view (FIG. 7). It will be understood that the shape and size of the perimeters 38 and 40 may be configured as required for a particular application. With reference to FIGS. 6 and 7, keyless entry module or subassembly 14 has a six-sided housing 136. A transverse interior wall 41 divides the interior space of housing 136 into a first compartment or space 42 and a second compartment or space 43. The sidewalls of the module housing 36 have thicknesses "W1," "W2," "W3," "W4," and "W5." Housing 136 may comprise a polymer or other suitable material. Lock sensor 44 is disposed in space or cavity 42. The lock sensor 44 may be a piezoelectric (touch) or capacitive (i.e. proximity) sensor. As discussed in more detail below, after closing vehicle door 2, a user actuates lock switch/sensor 44 to cause the latch 16 to shift to a locked configuration. This may be done by touch if sensor 44 is a touch-sensitive switch, or by moving a hand into the vicinity of sensor 44. As shown in FIG. 7, the antenna 18 may be disposed on an inner side of the layer of material 26 within cavity or space 43 such that antenna 18 faces outwardly when handle 10 is fully assembled to a vehicle door 2. Unlatch sensor 46 comprises a piezoelectric or capacitive sensor that is disposed on a sidewall 48 of housing 36. Sensor 46 determines if a user has touched module 14, or is within a predefined distance of module 14, to thereby unlatch powered latch 16.

The module 14 may include one or more LED lights 49 or a light pipe (FIGS. 6, 7) that are configured to illuminate the keypad numbers and also finger access pocket outer surface 12. The LED light for pocket illumination faces inward towards pocket 12 where as the LED lights for keypad numbers face outward towards surface 26. Surface 26 comprises a clear plastic that is painted black and laser etched to form the keypad numbers/openings adjacent to antenna layer 18 to permit light from an internally mounted LED light source 49. LED light source 49 is positioned such that it does not interfere with the function or package space of the antenna and illuminates the outer layer 26. Outer layer 26 may comprise a light-transmitting material (clear plastic can be painted black and the illumination area laser etched) for a particular application. The pocket 12 also can be illuminated to guide the user to the area where to place his/her fingers. For example, an LED 49 may be configured to light up if the system senses an authorized keyless fob in the vicinity, or if a correct security code has been entered utilizing the hidden keypad 20. Also, an LED 49 may light up when powered latch 16 shifts to an unlatched state. The LEDs 49 may have different colors to signify a "positive" result (e.g. an authorization code has been recognized by the system), and a different color (e.g. red) may be utilized to indicate that a "negative" outcome has occurred (e.g. the system determines that an incorrect authorization code has been entered utilizing the hidden keypad 20).

In use, if powered latch 16 is in a locked configuration, and a user approaches the vehicle 1, antenna 18 detects if the user has a keyless entry fob having a security code that is recognized by the system. If the system (e.g. keyless entry/door controller module 13) detects an authorized security code, the user is then authenticated, and the controller module 13 is in an "authenticated" state. If a user has been authorized, the user can then place his or her hand (or other object) within a predefined distance of sensor 46 (if sensor 46 comprises a capacitive sensor), and controller module 13 will generate a signal to the powered latch 16, which causes the latch 16 to shift to an unlatched configuration. Alternately, if sensor 46 comprises a piezoelectric or other touch sensor, a user can touch the back side surface 24 of module 14, and controller module 13 will then generate a signal causing powered latch 16 to shift to an unlatched configuration. Still further, the system may utilize a security code that is entered utilizing the hidden keyboard 20. The system may be configured to require a key fob for authenticating the vehicle owner.

After the powered latch 16 shifts to the unlatched position, a user may insert his or her fingers into outwardly facing recess 12 (FIGS. 2 and 3), and curl the ends of his or her fingers around edge 33 to contact inwardly facing surface 24. A user then pulls the door 2 to an open position. When a user closes the door, it may be closed initially in a conventional manner by swinging the door shut. This causes the powered latch 16 to shift to a latched configuration, holding the door 2 in a closed position. If a user desires to lock the door from the outside, he or she actuates sensor 44 (FIGS. 6 and 7) by touching the surface of module 14 adjacent the sensor symbol 15 (FIG. 5), or by bringing his or her hand sufficiently close to sensor 44 if sensor 44 comprises a capacitive sensor.

Figure 8:
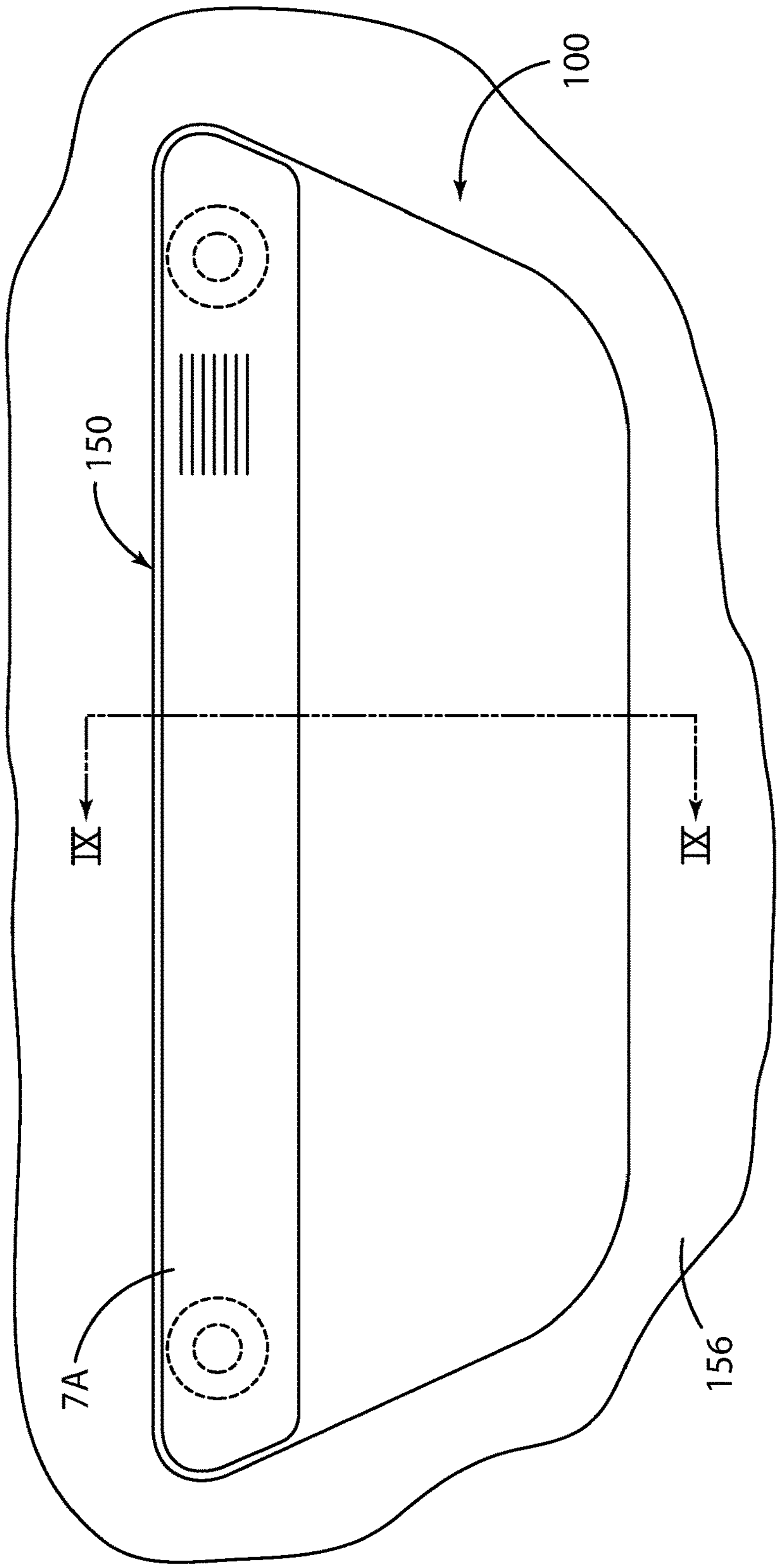
FIG. 8 is a partially fragmentary view of a flush-mounted door handle according to another aspect of the present invention.
Figure 9:
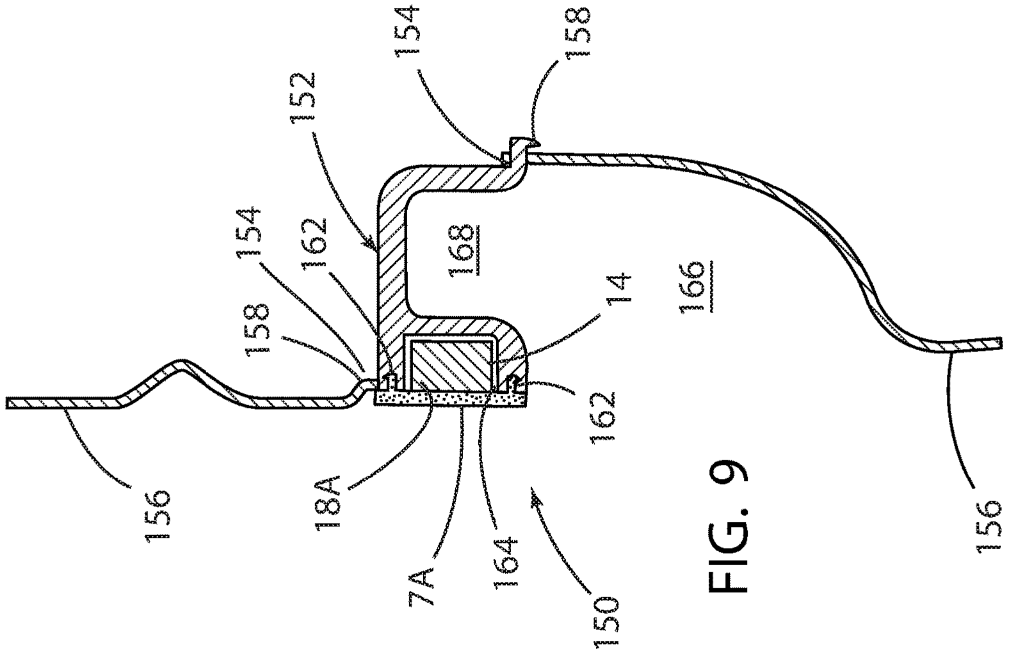
FIG. 9 is a cross sectional view of the door handle of FIG. 8 taken along the line IX-IX.

With further reference to FIGS. 8 and 9, a handle 150 according to another aspect of the present invention includes a polymer core member or element that is connected to edge 154 of sheet metal 156 utilizing hooks 158 or other suitable connector. Sheet metal 156 may be bent or formed inwardly to form a recess 166. A portion 168 of recess 166 is in the form of a pocket formed by core element 152. An appliqué 7A connects to core element or member 152 utilizing barbed connectors 162 or the like. Appliqué 7A and core member 152 together define a space 164. A module 14A that is substantially the same as module 14 is disposed in space 164. Module 14A is positioned such that antenna 18A faces outwardly and sensor 46A faces inwardly.

The flush handle assembly 10 described above in connection with FIGS. 1-9 eliminates the need for a movable, protruding handle assembly and associated components. This provides a more aesthetically pleasing appearance, reduces complexity, assembly labor, cost and improves vehicle aerodynamics and quality.

The flush handle assembly 10 has been shown and described mounted to an upwardly extending portion 7 of a door frame 6. However, the handle assembly 10 may also be positioned in the lower portion of door 2 (FIG. 1) below beltway 3. In general, the handle assembly 10 is positioned relatively close to the outer door edge 9 opposite front edge 17 of door 2 to thereby facilitate ergonomically pleasing opening/pivoting of the door by a user.

It is to be understood that variations and modifications can be made to the aforementioned structure without departing from the concepts of the present invention, and further it is to be understood that such concepts are intended to be covered by the following claims unless these claims by their language expressly state otherwise.

The invention claimed is:

1. A flush handle system for a vehicle, comprising:

a vehicle door defining inner and outer sides, the outer side having an outwardly facing flat outer surface, the outwardly facing flat outer surface defining an edge that extends around an opening in the outwardly facing flat outer surface;

a pocket formed in the vehicle door, wherein the pocket is connected to the opening;

an integrally formed handle that is immovable relative to the outer side of the vehicle door and extends over a portion of the pocket, the integrally formed handle including a vertical rear edge overlying the pocket whereby a user can insert fingers through the opening into the pocket and pull outwardly to open the vehicle door without moving the handle portion relative to the vehicle door;

an antenna to detect a specific key fob of the user when the user is within a predefined distance of the vehicle to authenticate the user to move a powered latch into an unlocked state in response to determining that the user has the specific key fob;

an unlatch sensor mounted to the vehicle door and to generate a predefined signal in response to detecting a hand of the user in the pocket at a predefined range of the unlatch sensor, wherein the unlatch sensor is selected from the group consisting of proximity sensors and touch sensors;

a proximity lock sensor comprising a touch surface to allow the user to unlock the vehicle door using a specific key fob detected by the antenna by touching the touch surface;

the powered latch defining locked and unlocked states and latched and unlatched configurations, wherein the powered latch retains the vehicle door in a closed position when the powered latch is in the latched configuration, and permits opening of the door when the powered latch is in the unlatched configuration; and wherein the powered latch unlatches by shifting from the latched configuration to the unlatched configuration in response to the unlatch sensor generating the predefined signal and if the powered latch is in the unlocked state;

wherein the powered latch shifts from the unlocked state to the locked state in response to an actuation of the proximity lock sensor when the vehicle door is closed; and wherein the locked and unlocked states of the powered latch correspond to manual door locks.

2. The flush handle system of claim 1, wherein:

the handle does not protrude outwardly beyond the flat outer surface of the outer side of the door.

3. The flush handle system of claim 1, wherein:

the unlatch sensor is located on a backside of the handle and extends along a majority of the handle adjacent the vertical rear edge.

4. The flush handle system of claim 1, wherein:

the door includes a window and an upright door pillar extending along a rear edge of the window, the upright door pillar including an inner frame structure and an outer structure that is spaced apart from the inner frame structure to define an interior space, the outer structure having an edge extending around an opening through the outer structure; and wherein the antenna, the unlatch sensor, and the proximity lock sensor are disposed in a module housing secured to the inner frame structure, wherein the module housing includes an outer portion disposed in the opening of the outer structure.

5. The flush handle system of claim 4, wherein:

the housing includes an outer layer having a smooth, planar outer surface that is coplanar with an outer surface of the outer structure adjacent the opening.

6. The flush handle system of claim 5, wherein:

the housing includes an inner sidewall that is spaced apart from the outer layer to form an interior space;

the antenna comprises a layer disposed in the interior space on an inner side of the outer layer of the housing; and the unlatch sensor is disposed in the interior space on the inner sidewall of the housing.

7. The flush handle system of claim 5, wherein:

The housing is disposed on the handle and extends over a portion of the pocket.

8. The flush handle system of claim 1, including:

a touchpad including a plurality of discrete touch sensors that permit user input of an authorization code; and an LED on the door configured to provide a first color light if a recognized authorization code has been entered, and to provide a different second color light if an incorrect authorization code has been entered.

9. The flush handle system of claim 8, including:

a lock symbol that lights up when the vehicle door is locked.

10. A flush handle system for a vehicle, comprising:

a vehicle door defining inner and outer sides, the outer side having a flat outer surface;

a handle comprising an opening in the flat outer surface that leads to a pocket formed in the vehicle door and including a fixed non-movable flange extending over a portion of the pocket whereby a user can insert fingers into the pocket and pull outwardly on the flange to open the vehicle door without moving the flange relative to the vehicle door, wherein said flange has a flat outer surface that is coplanar with the flat outer surface of the vehicle door and a vertical edge extending over a portion of the pocket;

an unlatch sensor mounted to the flange on an inner side thereof facing the pocket to generate a predefined signal in response to detecting a hand of the user in the pocket at a predefined range of the unlatch sensor, wherein the unlatch sensor is selected from the group consisting of proximity sensors and touch sensors;

a proximity lock sensor mounted on an outer side of the flange, the proximity lock sensor selected from the group consisting of proximity sensors and touch sensors and to allow the user to lock the vehicle door by moving the user's hand into a predetermined range of the proximity lock sensor;

a powered latch defining locked and unlocked states and latched and unlatched configurations, wherein the powered latch retains the vehicle door in a closed position when the powered latch is in the latched configuration, and permits opening of the vehicle door when the powered latch is in the unlatched configuration; and a low frequency (LF) antenna to detect a specific key fob of the user when the use is within a predefined distance of the vehicle to authenticate the user to move the powered latch into the unlocked state in response to determining that the user has the specific key fob;

wherein the powered latch unlatches by shifting from the latched configuration to the unlatched configuration in response to the unlatch sensor generating the predefined signal and if the powered latch is in the unlocked state;

wherein the powered latch shifts from the unlocked state to the locked state in response to actuation of the proximity lock sensor when the vehicle door is closed; and wherein the locked and unlocked states of the powered latch correspond to manual door locks.

11. The flush handle system of claim 10, wherein:

the door includes a lower portion, a window above the lower portion, and beltline between the window and the lower portion of the door, and wherein the door includes an upright structure extending vertically along a side edge of the window; and wherein the upright structure includes an outwardly facing outer side surface and an outwardly opening pocket, the upright structure further including a flange extending along at least one side of the pocket, the flange having an inner surface that faces generally opposite the outer side surface to form a handle, wherein the flange is rigidly fixed to the upright structure.

12. The flush handle system of claim 11, wherein:

a surface contour of the outer side surface of the upright structure over the flange is substantially identical to a surface contour of the outer side surface immediately adjacent the flange such that the appearance of the outer side surface of the upright structure over the flange is substantially the same as the appearance of the outer side surface immediately adjacent the flange.

13. The flush handle system of claim 10, including:

a visual indicator adjacent the handle that lights up when at least one of the unlatch sensor and the proximity lock sensor determines that the user has actuated the at least one of the unlatch sensor and the proximity lock sensor.

14. The flush handle system of claim 13, wherein:

the vehicle door includes a thin layer of material having a generally planar portion covering the unlatch sensor.

15. The flush handle system of claim 13, wherein:

the pocket has an oblong shape having a vertical dimension that is substantially greater than a horizontal dimension;

the flange extends horizontally over a portion of the pocket and terminates at an elongated vertically extending distal edge.

16. The flush handle system of claim 15, wherein:

the vertically extending distal edge is substantially linear, and wherein an opposite edge surface of the pocket has a concave curved shape whereby the pocket defines an elongated opening having opposite upper and lower ends.

17. The flush handle system of claim 14, wherein:

the thin layer of material extends over the flange and includes an edge extending along the distal edge of the flange.

* * * * *